US012664474B2

(12) United States Patent
Kalari et al.

(10) Patent No.: US 12,664,474 B2
(45) Date of Patent: Jun. 23, 2026

(54) GAP COUNTERS FOR SYNCHRONIZATION OF COMPUTE ELEMENTS EXECUTING STATICALLY SCHEDULED INSTRUCTIONS FOR A MACHINE LEARNING ACCELERATOR

(71) Applicant: SiMa Technologies, Inc., San Jose, CA (US)

(72) Inventors: Subba Rao Venkata Kalari, Cupertino, CA (US); Saurabh Jain, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 765 days.

(21) Appl. No.: 18/123,898

(22) Filed: Mar. 20, 2023

(65) Prior Publication Data

US 2024/0320539 A1 Sep. 26, 2024

(51) Int. Cl.
*G06F 9/46* (2006.01)
*G06N 20/00* (2019.01)

(52) U.S. Cl.
CPC .............. *G06N 20/00* (2019.01); *G06F 9/46* (2013.01)

(58) Field of Classification Search
CPC ................................. G06N 3/063; G06F 9/522
See application file for complete search history.

(56) References Cited

U.S. PATENT DOCUMENTS

| | | | |
|---|---|---|---|
| 12,001,848 B2 * | 6/2024 | Tran ...................... | G06F 9/3869 |
| 2016/0062797 A1 * | 3/2016 | Holt ...................... | G06F 9/3009 |
| | | | 718/108 |
| 2018/0225403 A1 * | 8/2018 | Nicol ...................... | G06F 30/34 |

* cited by examiner

*Primary Examiner* — Michael J Metzger
(74) *Attorney, Agent, or Firm* — Fenwick & West LLP

(57) ABSTRACT

A machine learning accelerator (MLA) implemented on a semiconductor die includes a computing mesh of interconnected compute elements. The compute elements execute a program of instructions to implement a machine learning network according to a static schedule for execution of the instructions. The compute elements include gap counters. The number of cycles between any two instructions (i.e., the gap count) in a statically scheduled program is known and fixed. A gap counter counts cycles during execution and must reach the expected gap count before the later instruction can be executed. Synchronization between different processing elements may be maintained by suspending counting for a period of time.

20 Claims, 16 Drawing Sheets

MLA
170

200 Machine Learning Network
- Architecture (layers, nodes, interconnections, operators applied at nodes)
- Parameters (values of weights, biases, parameters for operators)

220 ML Compiler
- Instruction set
- Known execution duration of instructions
- Known MLA topology 250 Computer Program
- Instructions implement MLN on MLA
- Allocation of computations to PEs
- MLA instructions are statically scheduled.

270 Machine Learning Accelerator (MLA)
- Mesh of PEs + SEs
- PEs execute instructions
- Data transfer paths between PEs and SEs

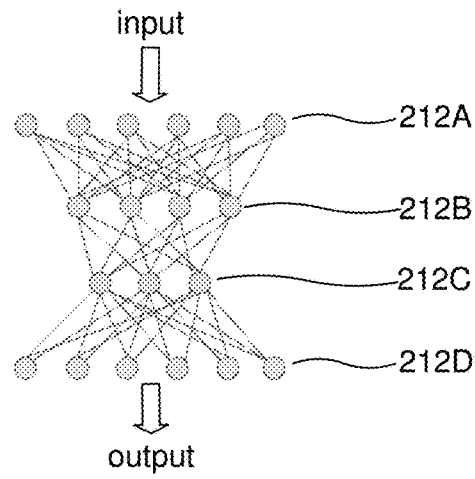

input 212A
212B
212C
212D output

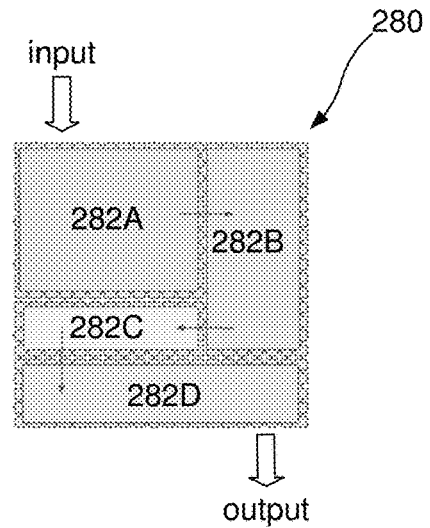

280 input 282A
282B
282C
282D output

FIG. 2A

GAP COUNTERS FOR SYNCHRONIZATION OF COMPUTE ELEMENTS EXECUTING STATICALLY SCHEDULED INSTRUCTIONS FOR A MACHINE LEARNING ACCELERATOR

BACKGROUND

1. Technical Field

This disclosure relates generally to the implementation of machine learning networks on hardware and more particularly to the synchronization of compute elements executing statically scheduled instructions.

2. Description of Related Art

Machine learning is an important recent trend in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether or to what confidence level objects are present within the images.

Machine learning networks typically require the handling of a large volume of data and the execution of a large number of computations. As a result, they are commonly implemented in compute facilities with access to significant resources, such as in the cloud or on server clusters. There can be many advantages if the machine learning network was instead embedded on edge devices, such as combined in a camera system. However, many types of edge devices, such as cameras, have resource limitations. They may be limited in memory, processing capability, power consumption, etc. As a result, on-chip compute elements may be simplified to conserve resources.

BRIEF DESCRIPTION OF THE DRAWINGS

Embodiments of the disclosure have other advantages and features which will be more readily apparent from the following detailed description and the appended claims, when taken in conjunction with the example embodiments in the accompanying drawings, in which:

FIG. 2A is a block diagram of a system with a MLA and corresponding compiler.

DETAILED DESCRIPTION OF THE PREFERRED EMBODIMENTS

Figure 1A:
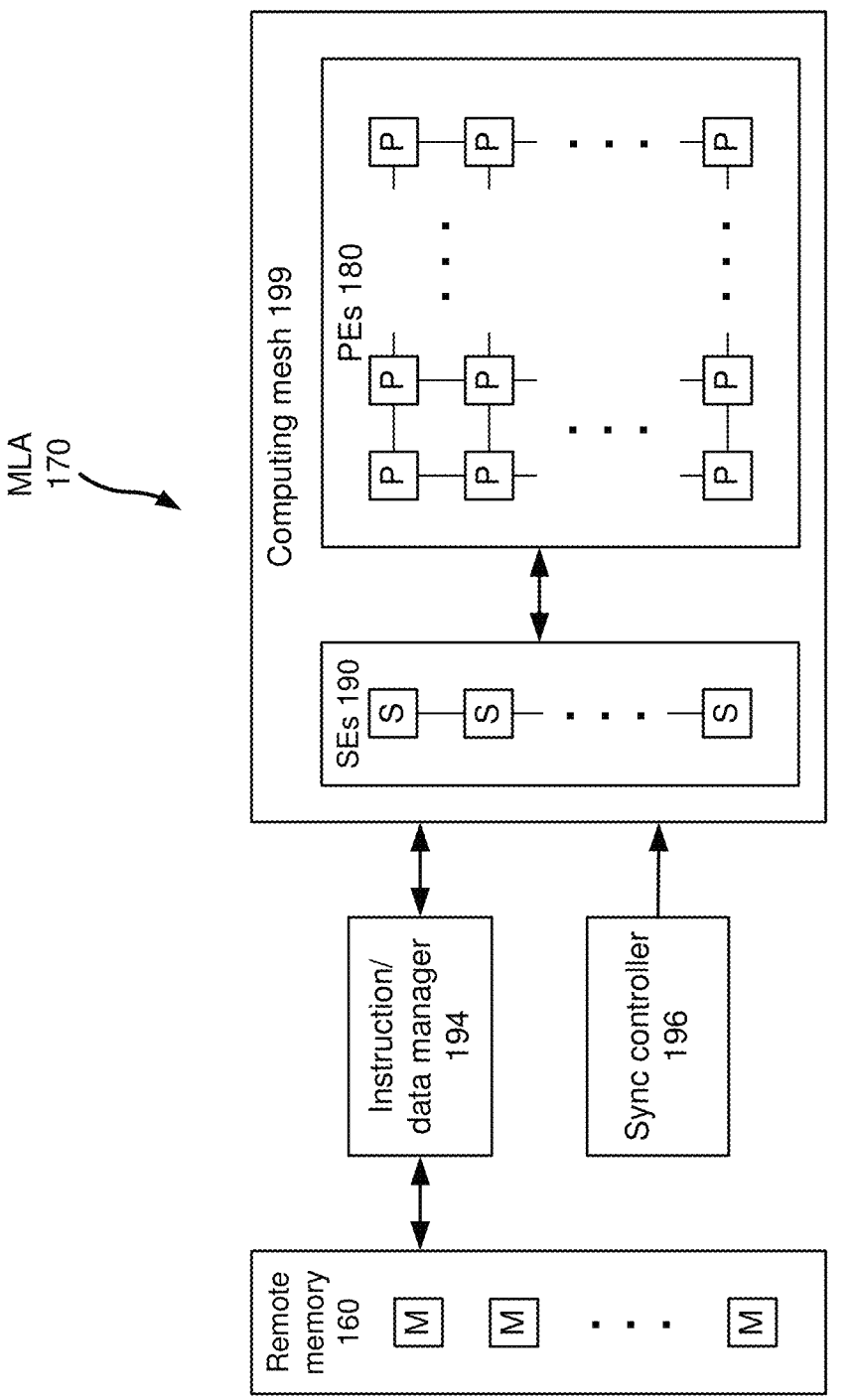
FIG. 1A is a block diagram of a system providing instructions and/or data to synchronized compute elements in a machine learning accelerator (MLA).

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks (MLNs) are commonly implemented in compute facilities with access to significant resources, such as in the cloud or on server clusters. However, the sources of input to machine learning networks may be located remotely from these large compute facilities. For example, cameras and other types of sensors may be edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras including both still image and video cameras, microphones, temperature sensors, pressure sensors and other types of sensors. The sensors may capture samples that are used as inputs to a computing pipeline within the edge device. Thus, it would be beneficial if MLNs could be implemented in edge devices.

A Machine Learning Accelerator (MLA) is described herein that may be built into an edge device. The MLA executes a machine learning network. As will be described in more detail below, one method to tune MLNs for implementation on edge devices is to use a compiler that, prior to run-time, generates a computer program with statically scheduled instructions for executing the MLN. For example, the compiler may determine which instructions are executed by which compute elements in the MLA at what time. Static scheduling enables the compute elements in the MLA to execute the instructions with no run-time conditions, branching or data or other dependencies. This may result in lower power consumption, simpler MLA design, and lower cost.

However, because on-chip memory is limited, the statically scheduled instructions and corresponding data may be stored in off-chip memory and then transferred to on-chip storage elements for consumption by the on-chip processing elements. On-chip memory such as SRAM has a known access time, so data transfers from/to SRAM storage elements to/from processing elements may be statically scheduled. However, SRAM typically has limited space.

Off-chip memory such as DRAM has much more space available, but it has variable access time, so the compiler may not be able to predict when the instructions or corresponding data fetched from the off-chip memory will be ready for execution and cannot statically schedule data and instruction transfers from DRAM. This issue may be compounded if instructions are to be executed by multiple processing elements according to a common static schedule because the compiler assumes that the processing elements are synchronized in their operation. One processing element cannot start execution of its statically scheduled instructions later than another processing element, just because its instructions or data arrived later.

If sufficient instructions or data are not available, then some instruction execution will be suspended until the transfers from off-chip memory catch up sufficiently. In one approach, this is implemented by using gap counters. The number of cycles between any pair of instructions in a statically scheduled program (i.e., the gap count) is known and fixed. A gap counter counts cycles starting with the first instruction in the pair and reaches the expected gap count as a condition to executing the second instruction in the pair. During normal operation, the number of cycles counted is the same as the actual number of cycles that occur. Synchronization between different processing elements may be maintained by suspending counting for a period of time, for example if sufficient instructions or data are not available. In this way, execution of the later instruction may be delayed, and coordination of the gap counters for the processing elements maintains synchronization of their instruction execution.

FIG. 1A is a high level diagram of a system that uses gap counters to maintain synchronization. The system includes a machine learning accelerator 170. The MLA 170 includes a mesh 199 of compute elements, which in this example includes interconnected storage elements (SEs) 190 and processing elements (PEs) 180. Within the computing mesh 199, data can be transferred between the SEs 190 and/or PEs 180 according to statically scheduled data transfer instructions. The PEs 180 perform computations according to statically scheduled compute instructions. These data transfer and compute operations within the mesh 199 are deterministic, meaning that the compiler may determine at compile time how many cycles are required to execute each instruction. As a result, these instructions may be statically scheduled by the compiler and the number of cycles between instructions (i.e., the gap count) is also known at compile time. The instructions are then executed by the compute elements 180, 190 within mesh 199 according to the static schedule clocked by a clock or counter.

The system in FIG. 1A also includes an off-chip memory 160. The MLA 170 fetches instructions and data from the off-chip memory 160 for the computing mesh 199. The MLA 170 also transfers data from the computing mesh 199 to the off-chip memory 160. The MLA 170 may do this through a dedicated memory interface, such as a direct memory access (DMA) interface. In FIG. 1A, the MLA 170 also includes an instruction/data manager 194. The manager 194 manages the transfer of instructions and/or data between the remote memory 160 and the compute elements 180, 190. In FIG. 1A, the manager 194 is shown as a box separate from the computing mesh 199. However, it may be implemented in a distributed fashion as part of each compute element 180, 190. It may also be implemented as separate elements, for example an instruction manager for the transfer of instructions and a separate data manager for the transfer of data. Using instructions as an example, the instruction manager 194 receives instructions from the off-chip memory 160 and transfers blocks of instructions to the computing mesh 199 for execution.

The time required for these transfers is not predictable enough to be statically scheduled. As a result, it is possible that the compute elements 180, 190 may reach a point in the static schedule where the required instructions or data for some compute element has not yet been transferred from the off-chip memory. If that compute element waits while the other compute elements continue execution, then the elements 180, 190 in computing mesh 199 will no longer be synchronized and the static schedule will be violated.

Figure 1B:
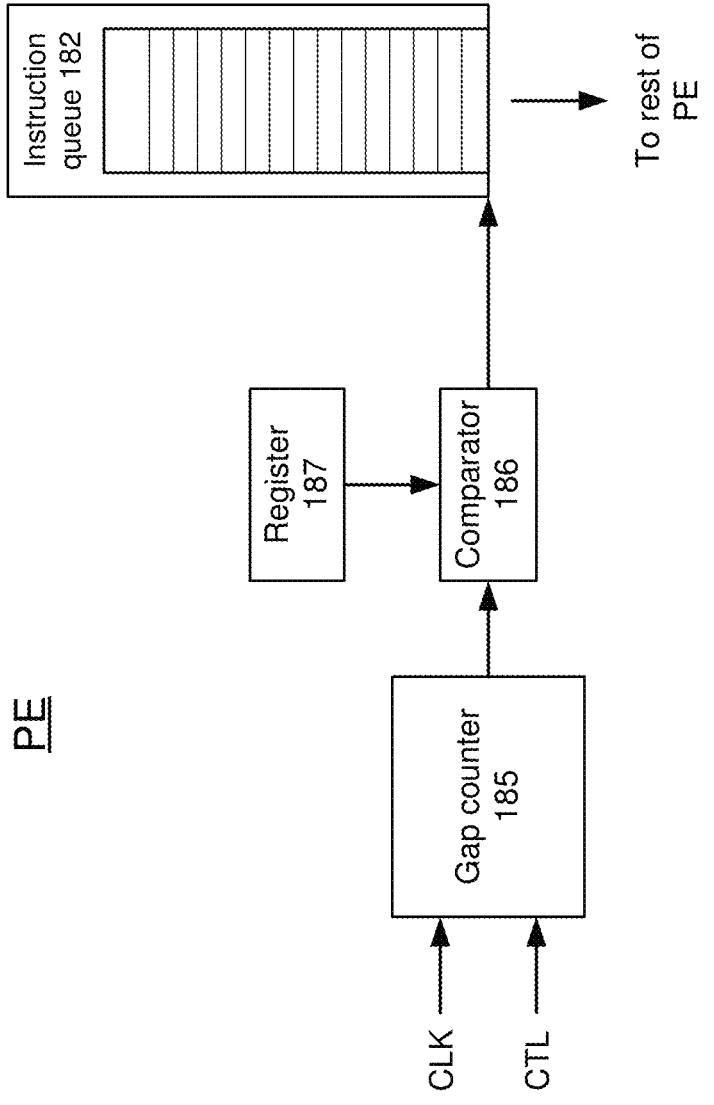
FIG. 1B is a block diagram of a compute element with a gap counter.

To handle these situations, the MLA 170 in FIG. 1A also includes a sync controller 196 and the PEs include gap counters, as shown in FIG. 1B. In FIG. 1B, the gap counter 185 receives the incoming clock cycles CLK and also receives control signals CTL. It outputs a count that comparator 186 compares to the expected gap count stored in register 187. The resulting output signal controls the execution of instructions from instruction queue 182.

In one implementation, the gaps are pairwise, with the pair being successive instructions across pipelines in a PE. Each instruction (except NOP) has a run_after field. The run_after field is checked before the execution of an instruction. The instruction is executed immediately if run_after is 0. Otherwise, the value is loaded into the gap counter and counted down subject to sync conditions. The instruction is executed when the counter reaches 1, in order to make it consistent with run_after=0.

During normal operation according to the static schedule, the PEs execute instructions clocked by the common CLK. The gap counter 185 counts these cycles. The number of cycles between two instructions is known, so the gap counter 185 reaches that known gap count, which is stored in register 187, as a condition to executing the second instruction. The comparator 186 determines when this condition is met.

In various situations, such as when data or instructions are not yet available, the sync controller 196 generates a sync command. The PE receives the sync command as a control signal CTL, and the gap counter 185 stops counting CLK cycles even though the clock may continue to run. In some cases, instructions in the PE may continue to execute according to the running clock CLK, even though the gap counter 185 has stopped counting the clock cycles. However, pausing the gap counter 185 effectively suspends operation of the computing mesh for later instructions because the gap counter 185 will not reach the gap count while counting is paused and, as a result, the later instructions will not execute. When the situation that gave rise to the sync command is resolved, the sync controller 196 may issue a resume command and the gap counter 185 then resumes counting CLK cycles.

Figure 2B:
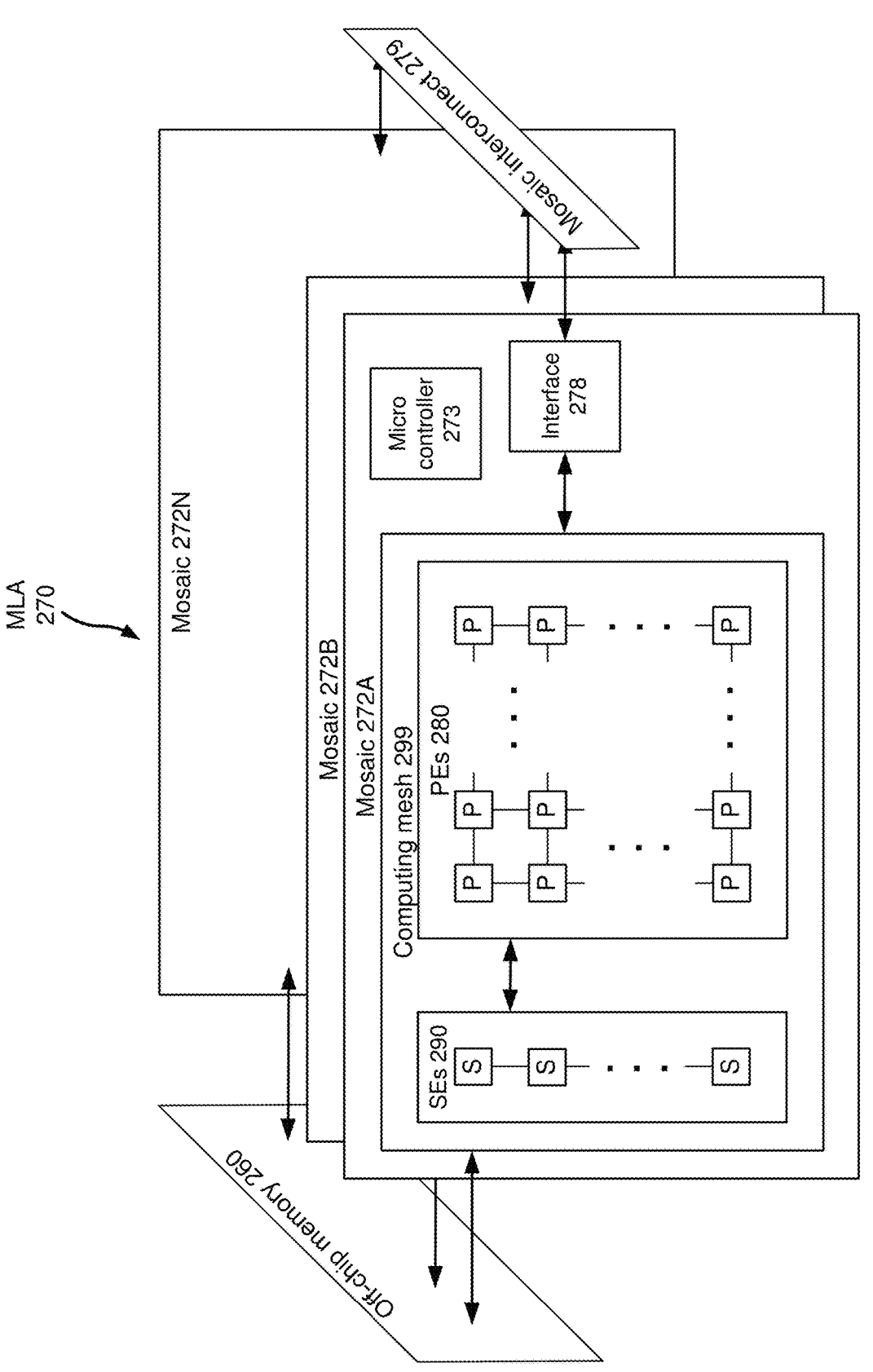
FIG. 2B is a block diagram of a hardware system including an MLA.
Figure 2C:
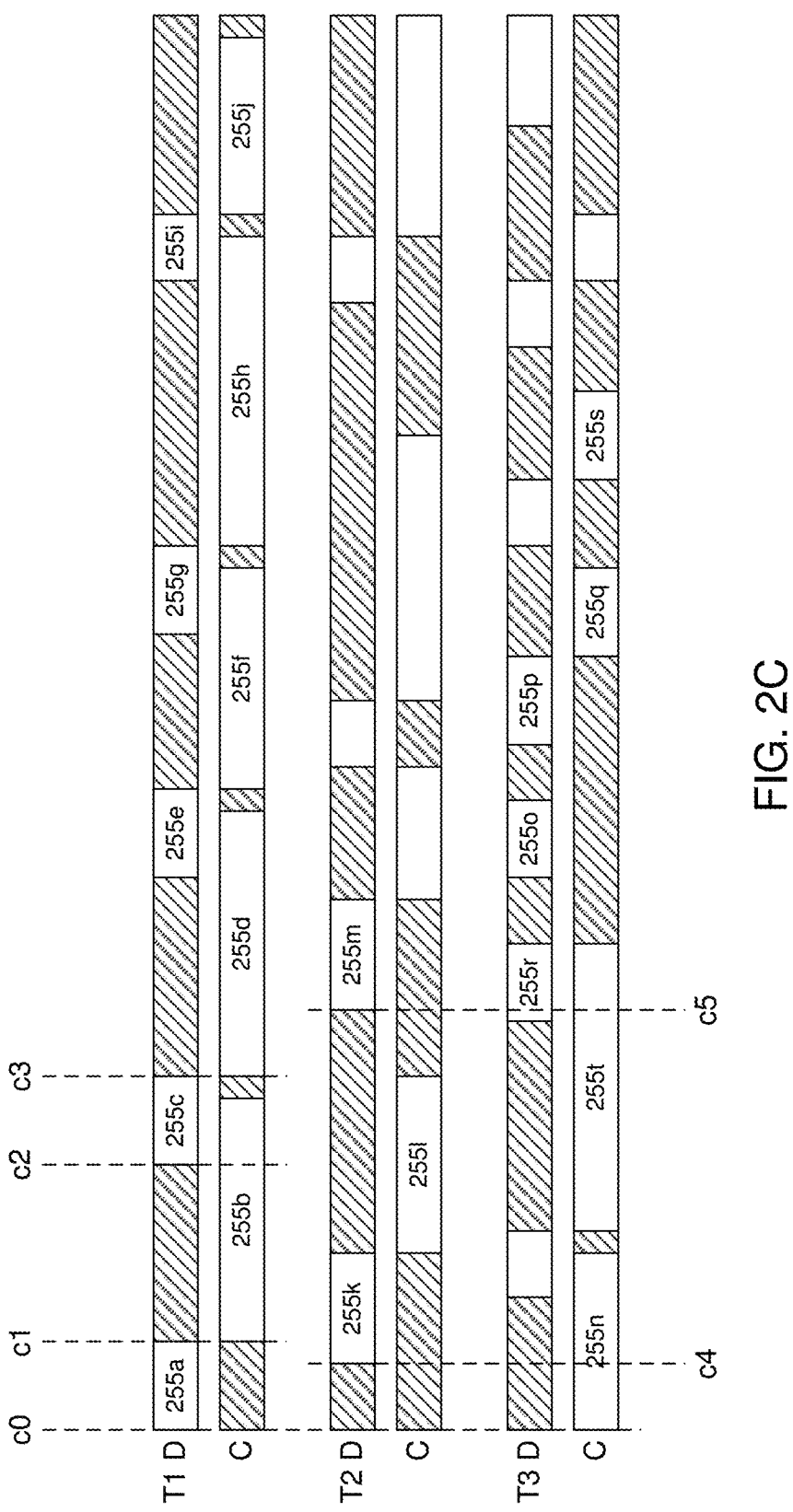
FIG. 2C illustrates execution of a statically scheduled program produced by a compiler.

FIGS. 2A-2C are more detailed descriptions of an example system that executes a statically scheduled program. FIG. 2A is a block diagram of a system with a MLA and corresponding compiler. The MLA may be part of an edge device. The compiler 220 receives a description of a machine learning network 200 and generates a computer program 250 that implements the machine learning network using MLA 270. The computer program 250 includes instructions that are executed by processing elements (Tiles) and/or storage elements (on-chip memory) in the MLA according to a schedule determined by the compiler. Deterministic instructions may be statically scheduled with respect to each other, because the compiler can determine which instructions are executed by which compute elements at what times, as will be explained in greater detail below.

For example, for the statically scheduled instructions, there are no conditions, branching or data dependencies that can be resolved only at run-time, and which would affect the timing and order of the execution of the instructions.

Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the static schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 200 may be described by an architecture and parameters. A depiction of an MLN is shown to the right of box 200 in FIG. 2A. Most MLNs include multiple layers 212, each with one or more nodes which are represented by circles in FIG. 2A. The lines between nodes in FIG. 2A represent interconnections between the nodes and layers. Each node calculates a weighted sum of the values received from its connected nodes, possibly also applying a bias. Examples are matrix multiplication and convolution. Each node may also apply certain functionality or operators, such as nonlinear functions (e.g., tan h function), softmax operator, etc. A typical node may compute an output:

$$y = F\left(\sum w_i x_i + b\right) \tag{1}$$

where $x_i$ are the inputs received from other nodes i, $w_i$ are weights, b is a bias and F( ) is a nonlinear operator. The MLN architecture includes the number of nodes and layers and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 200 or more layers. Examples of inputs include text, images and video. Some of the layers may be fully interconnected where every node in one layer provides input to every node in the next layer. Others may be more locally interconnected, for example to implement convolutions. Each weighted interconnect represents a scalar multiplication. The total number of scalar multiplications required to implement an MLN may be on the order of millions, billions, tens of billions or even more. These may be carried out by matrix multiplications.

The MLA 270 includes a plurality of Tiles 280 and an on-chip memory system with storage elements (not shown in FIG. 2A) implemented on a semiconductor die. The Tiles are organized into one or more meshes of interconnected Tiles. A depiction of a Tile mesh is shown to the right of box 270 in FIG. 2B. In this example, the Tiles 280 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 2A, the computations performed by layers 212A-D are allocated to groups 282A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 220 receives a description of the MLN 200 and generates a computer program 250 that implements the MLN using the MLA 270. The computer program 250 receives an input sample for the MLN and executes the operations of the MLN to produce the output for the MLN. The computer program 250 includes instructions to be executed by the Tiles for implementing computations in the MLN and may also include instructions to be executed by other elements, such as the storage elements of the on-chip memory or a controller outside the Tiles. For additional examples and description of the MLA and related components, see U.S. application Ser. No. 16/840,216, "Machine Learning Network Implemented by Statically Scheduled Instructions, with Compiler," which is incorporated by reference herein in its entirety.

The program of statically scheduled instructions may include a series of computations required to implement a portion of the MLN, where the time required for each computation and associated data transfers is known. As a result, the compiler may statically schedule these instructions. The resulting computer program produced by the compiler then implements an allocation of compute instructions to Tiles and a schedule for executing the instructions as determined by the compiler, although these may not be expressly contained with the computer program.

Non-deterministic instructions are also used. For example, non-deterministic instructions may include data fetch and instruction fetch from off-chip memory where the time required to execute the operation varies too much to allow reliable synchronization with other operations. Other examples include computations that occur off-chip, and conditions, branching and other programmatic constructs that depend on values not known until run-time.

FIG. 2B is a block diagram of a hardware system including an MLA 270. The MLA 270 includes all the components shown in FIG. 2B, except the off-chip memory 260. The MLA components are implemented on a single die as part of a single chip. The MLA 270 includes one or more mosaics 272A-N. In this example, all of the mosaics are the same. Each mosaic 272 includes a computing mesh 299 that includes processing elements (PEs or Tiles) 280 and storage elements (SEs) 290. Each mosaic 272 also includes a controller 273, which may include the sync controller 196 of FIG. 1A. In FIG. 2A, the overall memory system is a multi-level memory system, which includes a level 1 (L1) memory distributed within the Tiles, a level 2 (L2) memory of SEs 290 which is shared by the Tiles, and the off-chip memory 260. If there are multiple mosaics 272, the MLA 270 may include a dedicated interconnect 279 for connecting the different mosaics. Each mosaic also includes an interface 278 to the interconnect 279. In FIG. 2B, The SEs 290 handle data transfer to and from the off-chip memory 260. The PEs 280 receive instructions from the off-chip memory 260. For convenience, the interface to off-chip memory 260 is not shown in FIG. 2B.

FIG. 2C illustrates execution of a statically scheduled program produced by a compiler. This example shows only instructions executed by PEs (Tiles) but the statically scheduled program typically also includes instructions executed by SEs. Execution of the static schedule begins at some time when all of the Tiles are synchronized, which for convenience is marked as cycle c0 in FIG. 2C. An external controller, such as the sync controller 196, may synchronize the Tiles and start execution of the statically scheduled program when all Tiles are ready.

The example instructions shown in FIG. 2C are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 255_a_ transfers data into Tile 1 from either another Tile or from one of the SEs, and instruction 255_b_ then performs a computation that consumes that data. Instruction 255_b_ is dependent on instruction 255_a_. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 255_a_ is known, the compiler knows when the data will be available (for convenience, marked as cycle c1 in the figure) and can construct a static schedule in which instruction 255_b_ starts execution then. The duration of instruction 255_b_ is also known, so the compiler knows that compute instruction 255_d_ may start after instruction 255_b_. In this case, the compiler determines a static schedule in which instruction 255_d_ starts at cycle c3. Compute instruction 255_d_ depends on data brought into the Tile by instruction 255_c_. The duration of instruction 255_c_ is known, so the compiler knows that in the static schedule, instruction 255_c_ must start at cycle c2 or earlier. This pattern is repeated for pairs of data transfer instructions and compute instructions 255_e-f_, 255_g-h_, 255_i-j_.

For Tile 2, compute instruction 255_l_ depends on data from data transfer instruction 255_k_. However, instruction 255_k_ does not start immediately at cycle c0. Rather, it has a delayed start at cycle c4. This may be because the data transfer path required by instruction 255_k_ is occupied by some other data transfer instruction and is not available until cycle c4. The start time of instruction 255_k_ in the static schedule is not determined by run-time arbitration or contention mechanisms for the shared data transfer path. Rather, the compiler knows that the data transfer path is occupied since the compiler knows the start times and durations of all the data transfer instructions, so the compiler simply creates a static schedule in which instruction 255_k_ does not start until cycle c4 when the compiler knows the data transfer path will be available. Similarly, data transfer instruction

255_m_ has a delayed start time. Perhaps the T2 D pipeline is being used to transfer out the results of computation 255_l_ and does not become available until cycle c5.

For Tile 3, computation 255_n_ starts immediately at cycle c0. Perhaps the required data was loaded into Tile 3 during some prior phase. Data transfer instructions 255_o_ and 255_p_ load data for compute instruction 255_q_. They are separated in time, perhaps because different pieces of data were not available or the data transfer paths were not available until those times. As a final example, data transfer instruction 255_r_ loads data for compute instruction 255_s_. In the static schedule, the compiler places instruction 255_r_ well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 2C, the computer program may specify that instruction 255_a_ executes at cycle c0, instruction 255_b_ at cycle c1, instruction 255_c_ at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 255_a_ will end at cycle c1 and instruction 255_b_ is supposed to begin at cycle c1. It may fill the space between cycles c0 and c1 with NO-OPs for the T1 C pipeline. The T1 C pipeline then just continuously executes instructions from its queue, and the NO-OPs ensure that instruction 255_b_ is executed according to the compiler's static schedule. In yet another approach, the static schedule may be implemented by hardware. The T1 C pipeline may just stall on the execution of instruction 255_b_ until the data from instruction 255_a_ is ready. The compiler knows that data will be ready at cycle c1 and, therefore, instruction 255_b_ will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

The static schedule of FIG. 2C occurs within the computing mesh 299. The compiler assumes that instructions executed according to the static schedule have been fetched from the off-chip memory 260 in time for their execution, for example, that compute instruction 255b has been fetched from off-chip memory by cycle c1, and compute instruction 255d has been fetched by cycle c3. Similarly, the compiler also assumes that data used by instructions of the static schedule have also been retrieved from the off-chip memory 260 in time for their consumption. For example, if the data for data transfer instruction 255a is coming from off-chip memory, then it has been transferred to the relevant SE or PE by cycle c0, so it can then be transferred by instruction 255a to Tile 1. Similarly, the data for data transfer instruction 255c has been transferred to the relevant SE or PE by cycle c2.

Figure 3A:
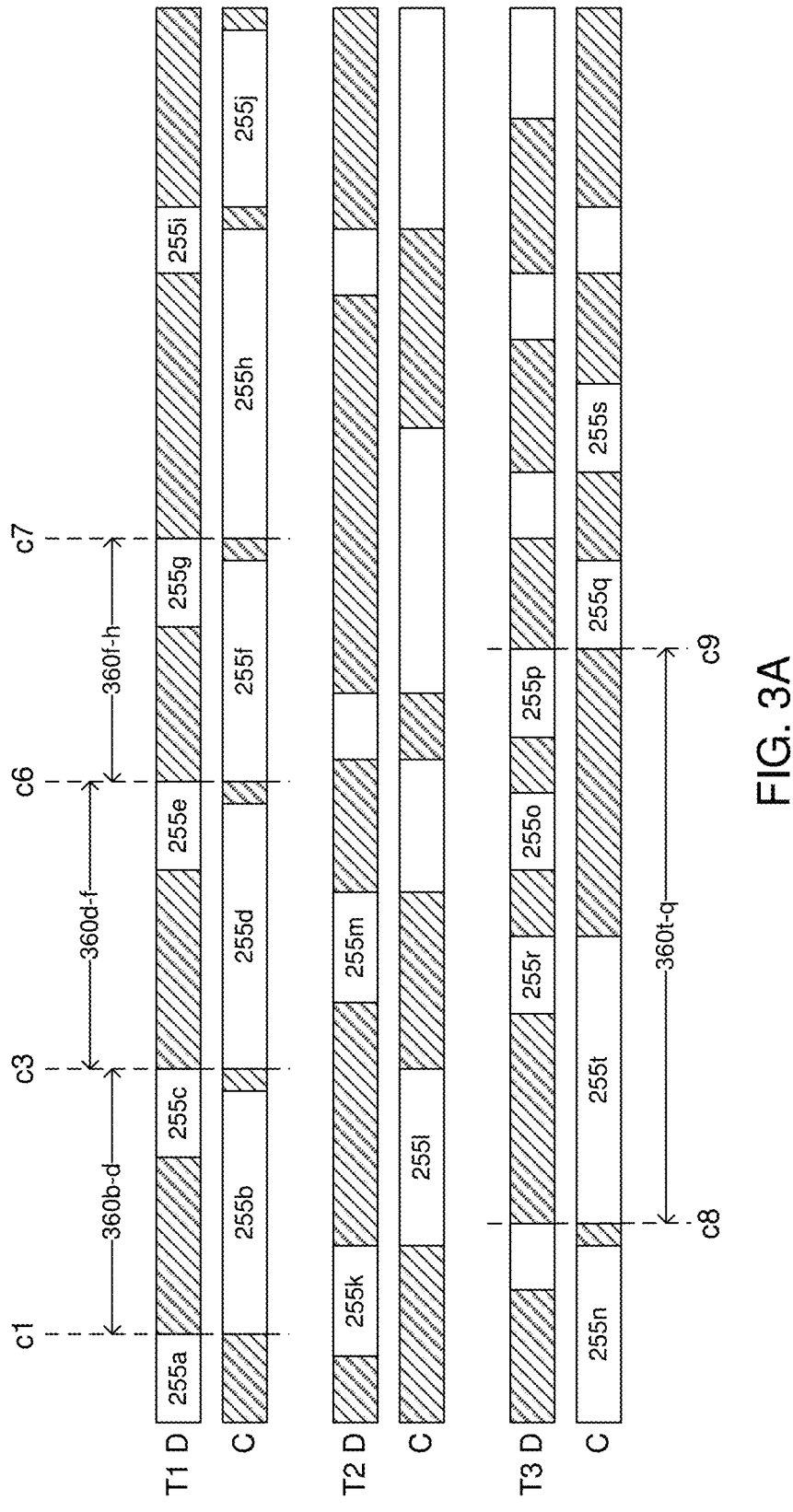
FIG. 3A illustrates gap counts for pairs of instructions.
Figure 3B:
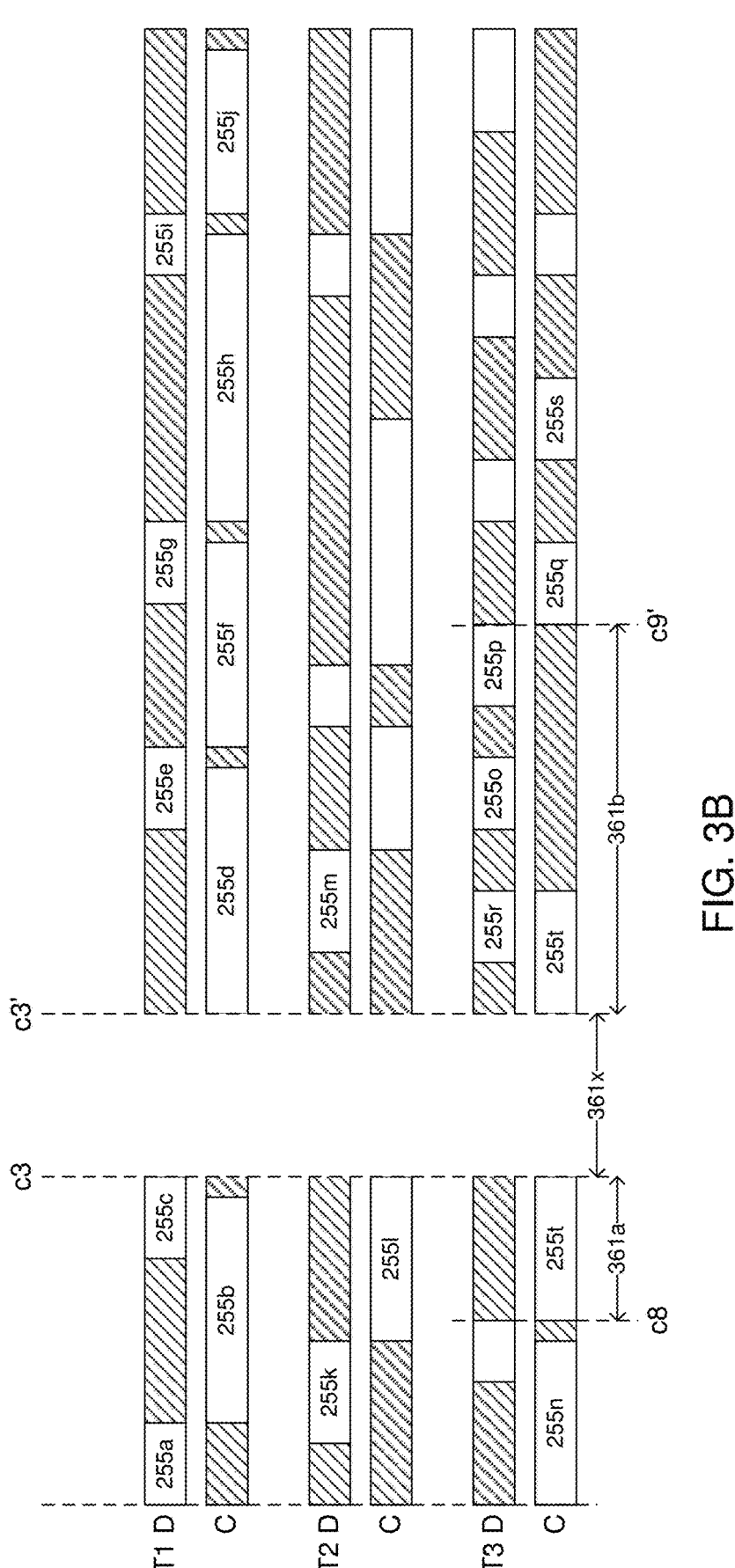
FIG. 3B-3D illustrate the use of gap counting to suspend execution of a statically scheduled program.

FIGS. 3A-3B show the use of gap counters, continuing the example shown in FIG. 2C. FIG. 3A illustrates gap counts for different pairs of instructions. Because the instructions in FIG. 2C are statically scheduled, the compiler knows when each instruction is scheduled to start execution and how long that execution will take. The compiler also knows when the next instruction is scheduled to start execution. The time period between execution of the two instructions is the gap count. In this example, the gap counts are the time periods between the beginning of each instruction. For example, for the Tile 1 compute pipeline, instruction 255b starts at cycle c1, instruction 255d starts at cycle c3, instruction 255f starts at cycle c6 and instruction 255h starts at cycle c7. The gap count 360b-d for the pair of instructions 255b and 255d is (c3-c1), the gap count for instructions 255d and 255f is (c6-c3) and the gap count for instructions 255f and 255h is (c7-c6), as indicated by the horizontal arrows. Similarly, the gap count 360t-q between instructions 255t and 255q of the Tile 3 compute pipeline is (c9-c8).

FIG. 3A shows normal operation of the computing mesh. When instruction 255b starts execution, the corresponding gap counter starts to count cycles. By the time of cycle c3, the gap counter will have counted (c3-c1) cycles, which matches the expected gap count 360b-d. Therefore, instruction 255d is allowed to execute. Similarly, when instruction 255t starts execution, the corresponding gap counter starts to count cycles. By the time of cycle c9, the gap counter will have counted (c9-c8) cycles, which matches the expected gap count 360t-q. Therefore, instruction 255q is allowed to execute.

Figure 3C:
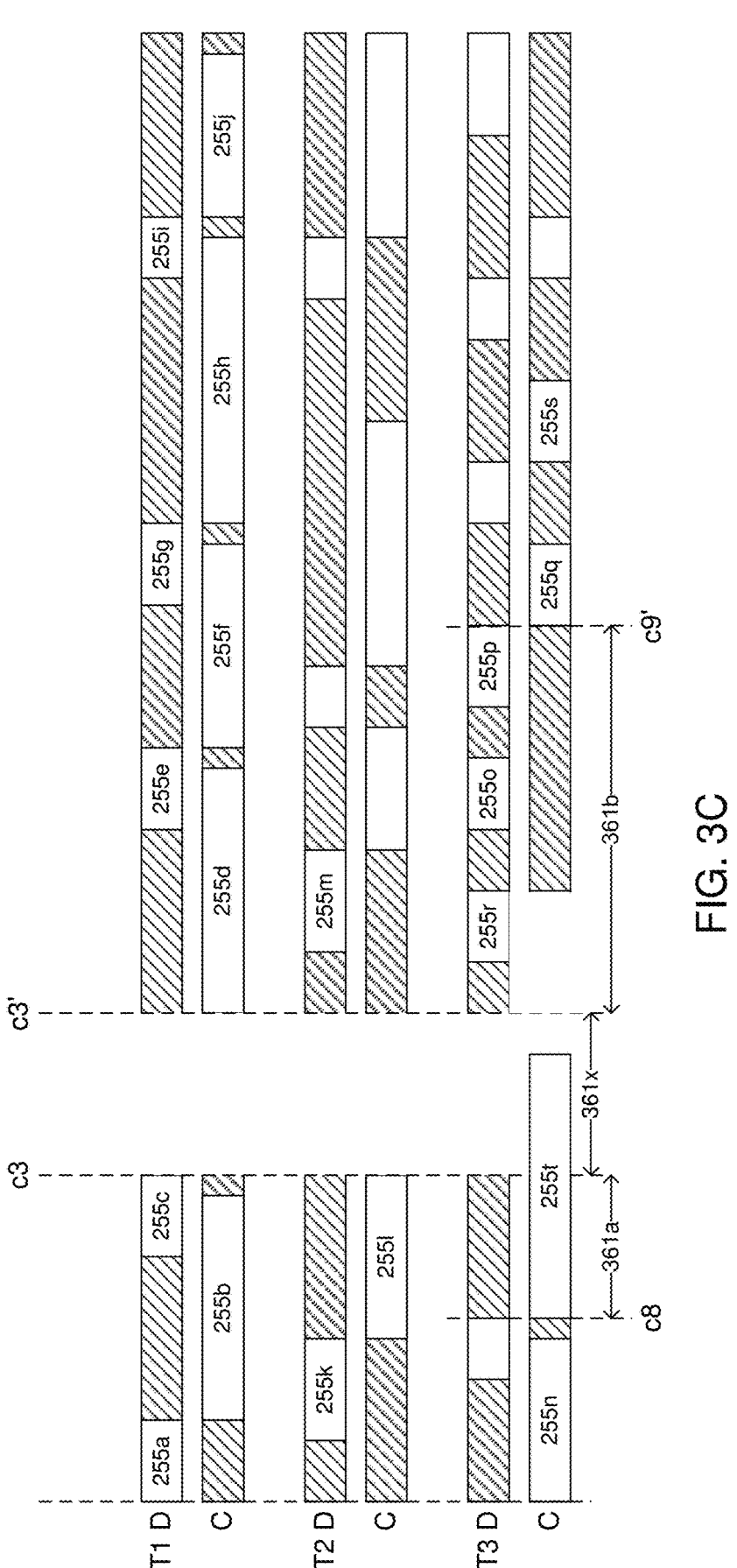
Figure 3D:
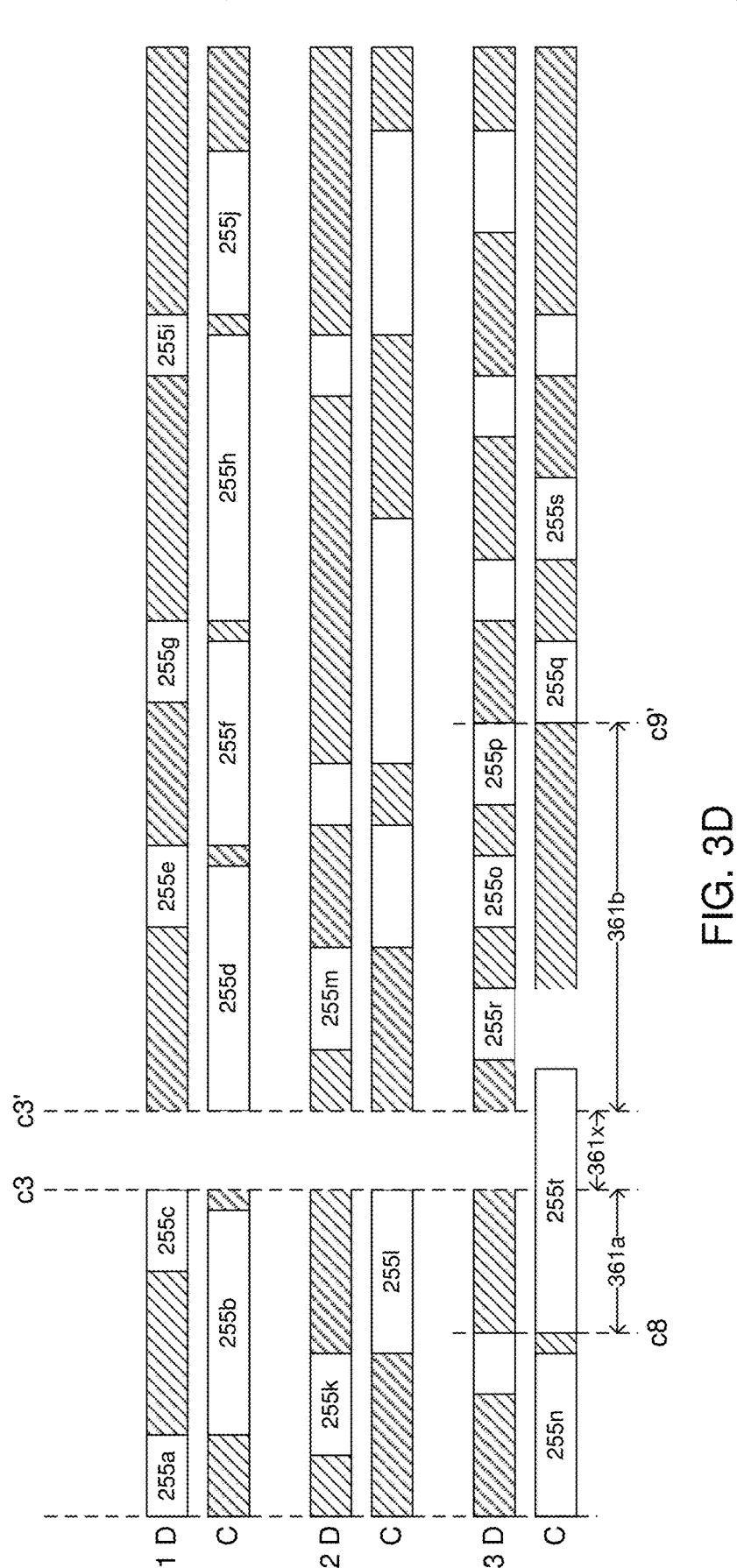

FIG. 3B-3D illustrates a situation when the sync controller suspends execution of the statically scheduled program. These examples are based on the static schedule shown in FIG. 3A. In all of these examples, the compute instruction 255d is not available in time and operation is suspended until it becomes available (i.e., when it is transferred from off-chip memory to the instruction queue for Tile 1). In FIG. 3B, all compute elements in the mesh are suspended at cycle c3, which is the cycle that requires instruction 255d. For convenience, cycle c3 is referred to as the stall cycle. All the compute elements resume operation at a later time when instruction 255d becomes available. Note that this later time, denoted c3', is still cycle c3 as far as the statically scheduled program is concerned. The difference is that cycle c3' is delayed in the real world. In this example, instruction 255t is stopped mid-instruction and resumes at cycle c3' when operation for all compute elements resumes. Also, the gap counters stop counting during the time period c3 to c3'. For gap count 360t-q, the corresponding gap counter counts during period 361a, stops counting during the suspension period 361x (even though the clock is still operating), and then counts again during period 361b. As a result, the gap counter does not reach the required gap count until cycle c9', which is the correct result to maintain synchronization with the other compute elements.

In FIGS. 3C-3D, some compute elements continue to operate beyond the stall cycle c3. In FIGS. 3C and 3D, instruction 255t continues to execute. This is easily implemented because the clock continues to operate so instruction 255t may continue to execute regardless of the sync command issued by the sync controller. However, the corresponding gap counter stops counting, the same as in FIG. 3B. Because the gap counter stops counting for suspension period 361x, instruction 255q does not execute until cycle c9', which maintains synchronization with the rest of the compute elements.

In FIG. 3D, the delay between c3 and c3' is shorter, so instruction 255t does not run to completion before c3'. However, the net effect is the same. The gap counter stops counting during the (shorter) suspension period 361x and then starts counting again for period 361b. Instruction 255q does not execute until cycle c9', which maintains synchronization with the rest of the compute elements.

In FIGS. 3C-3D, different compute elements might continue to operate for different numbers of cycles. In this way, compute elements suspend and resume operation at different times. This avoids a situation where all compute elements stop at the same time and then restart at the same time, which can cause power spikes.

Figure 4A:
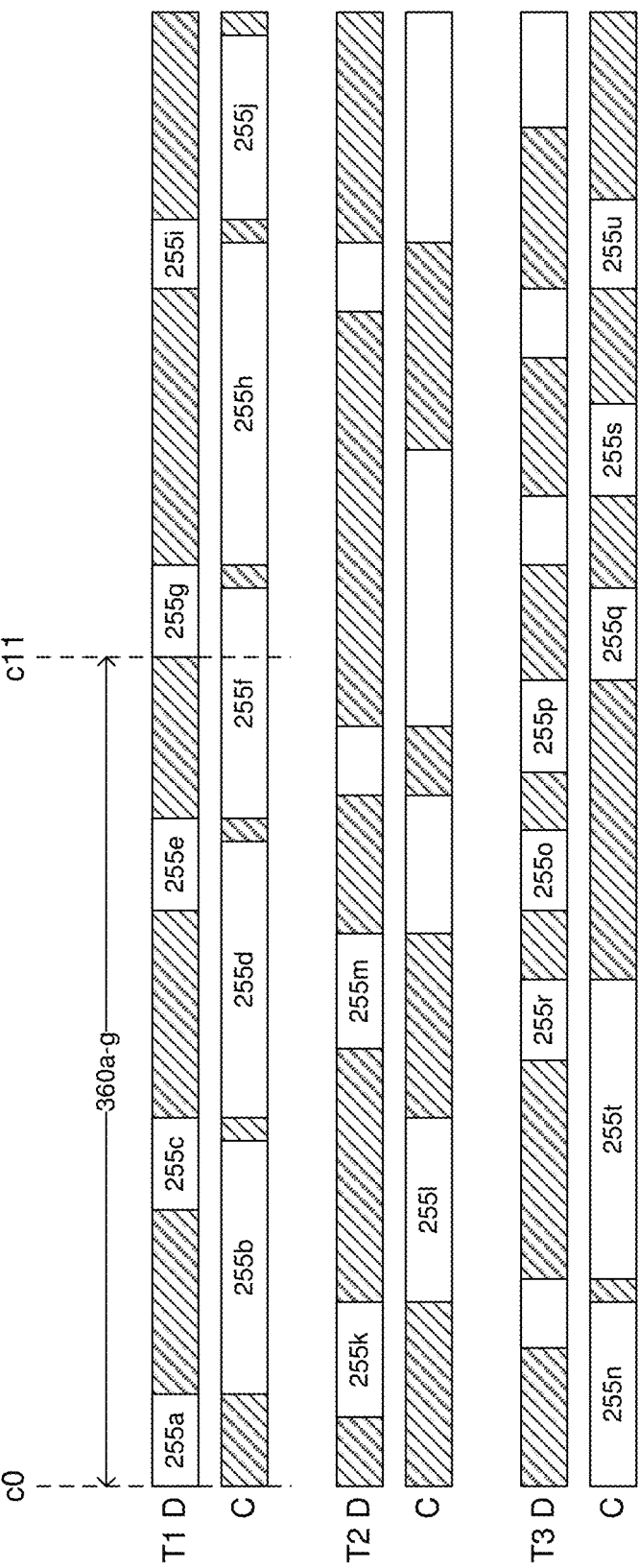
FIG. 4A illustrates gap counts that span multiple instructions.

Various alternatives of the approaches described herein will be apparent. For example, in FIG. 3, the gap counts were for consecutive instructions: from 255b to 255d, from 255d to 255f, from 255f to 255h. However, the gap counts may span multiple instructions. FIG. 4A shows an example where the gap count 360a-g is for the pair of instructions 255a and 255g. In this particular example, the set of instructions for this gap count includes instructions 255a,b,c,d,e,f, from both the Tile 1 data pipeline and the Tile 1 compute pipeline. In this example, instruction 255a is the only instruction of 255a-f that affects other Tiles. It may be a data transfer from a different Tile, whereas data transfer instructions 255c and 255e are data transfers within Tile 1 and compute instructions 255b,d,f are calculations using data available within Tile 1. Therefore, if instruction 255a is executed, then instructions 255b-f may also be executed without affecting other Tiles. Instruction 255g does affect other Tiles, so the gap count 360a-g is established between instructions 255a and 255g. Put in another way, instructions 255b,c,d,e,f do not have a gap count condition. Rather, instruction 255g is the first instruction after 255a that has a gap count condition.

Figure 4B:
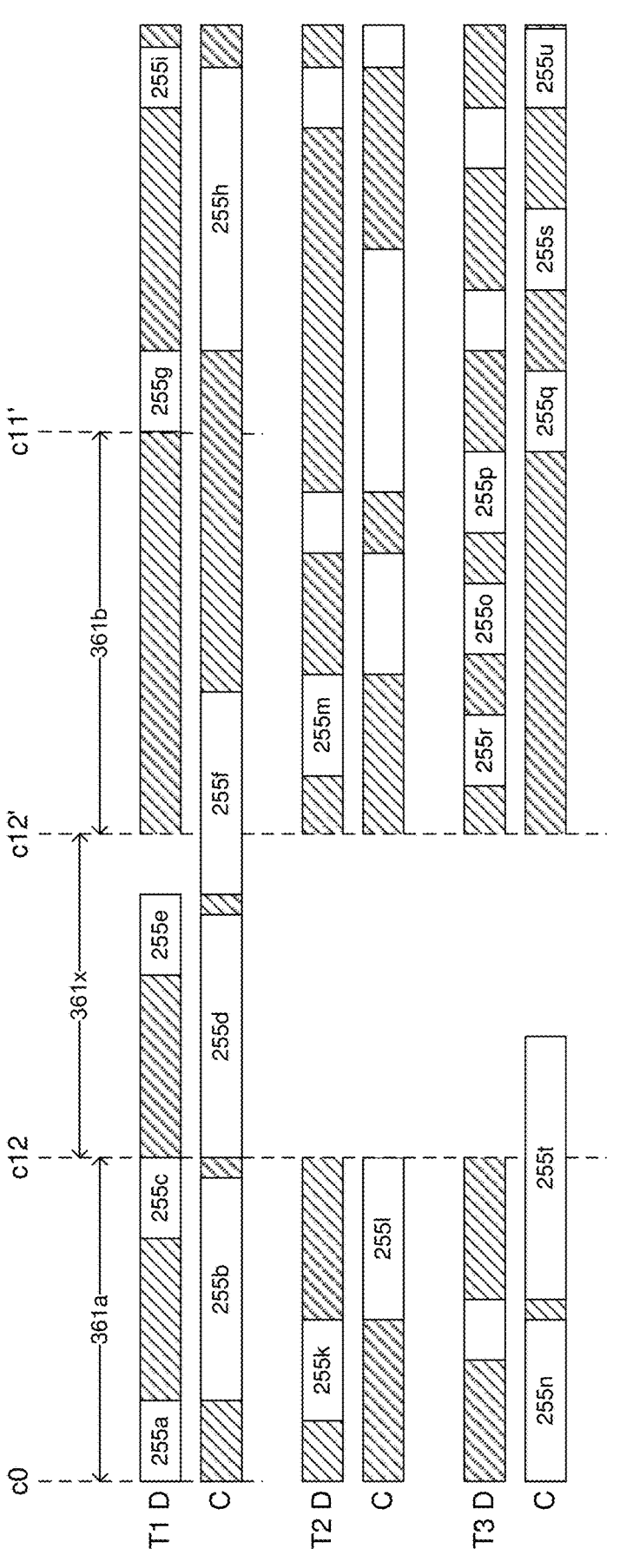
FIG. 4B illustrates the use of gap counting to suspend execution of a statically scheduled program.

In this case, multiple instructions may be executed after the stall cycle c12, as shown in FIG. 4B. This can be useful so long as those instructions do not affect or depend on other compute elements, for example if instructions 255b-d-f can be executed entirely within Tile 1. This may be determined based on the type of instruction. In FIG. 4B, a sync command takes effect at cycle c12 and a resume command takes effect at cycle c12'. For Tile 1, instruction 255g is the next instruction that relies on a gap count, so instructions 255d,e,f are executed during the suspension period 361x. The gap counter for Tile 1 counts during period 361a and 361b and reaches the gap count 360a-g at cycle c11', which maintains synchronization with the other Tiles. In Tile 3, instruction 255t also executes during the suspension period 361x.

In the example of FIG. 4B, the gap count spanned two separate pipelines. That is, the gap count was the gap between one instruction on one pipeline and another instruction on a different pipeline. The gap count could also span two Tiles: the gap between one instruction executing on one Tile and another instruction executing on a different Tile. This may be the case if the Tiles are grouped together for computation purposes and do not affect other Tiles.

Determining the gaps and gap counts may be performed by the compiler, since the compiler generates the static schedule. This may include both defining the gaps (i.e., gap between which two instructions) and calculating the corresponding gap counts. The compiler would output this information. It may be embedded with the program instructions themselves. Alternatively, the instruction/data manager may perform some or all of these functions.

The number of gap counters and the assignment of gap counters to compute elements may vary in different architectures. There may be one gap counter per compute element, per processing element or per storage element. Alternatively, multiple elements may share gap counters, or there may be multiple gap counters per element.

Figure 5A:
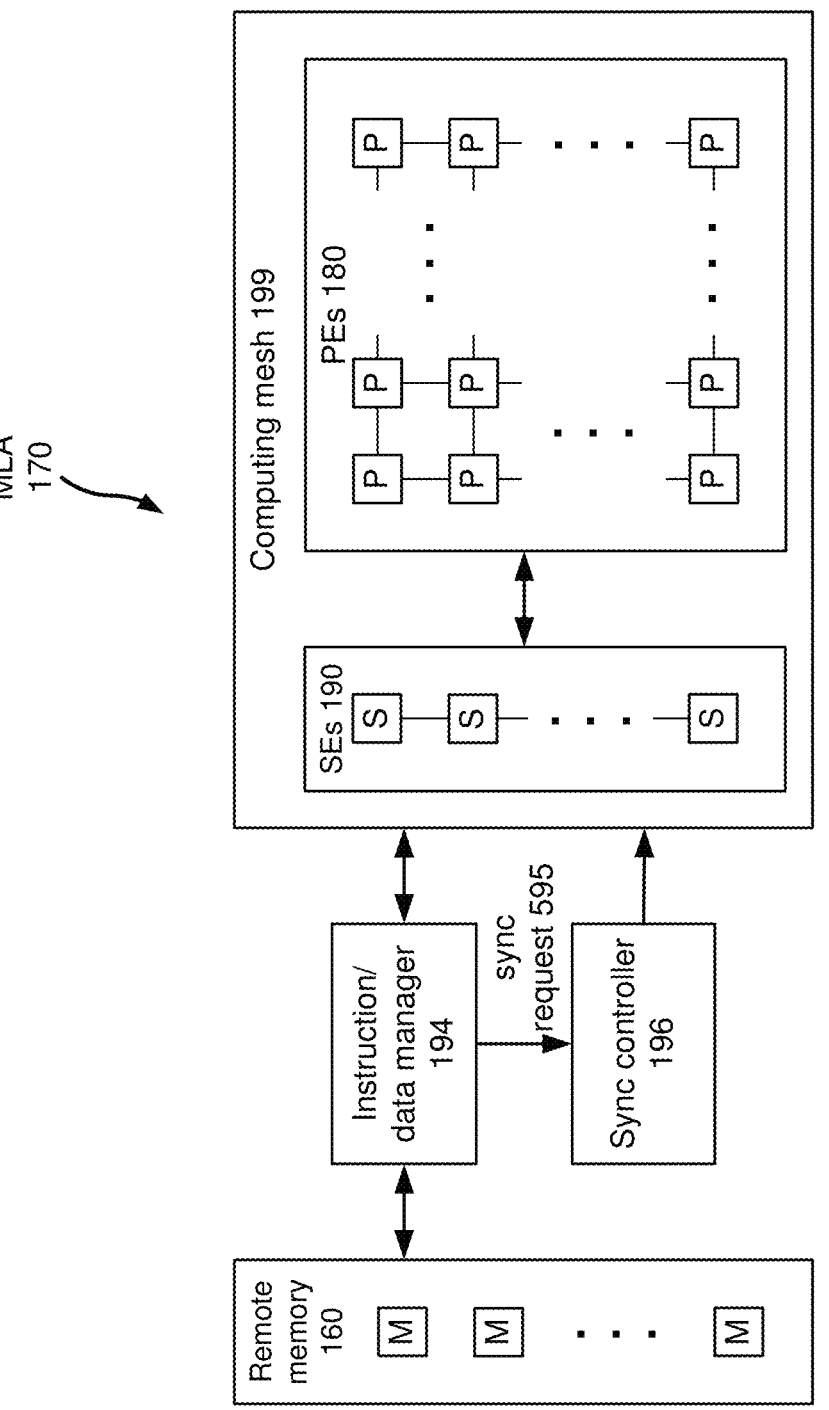
FIG. 5A is a block diagram illustrating sync requests from an instruction/data manager.

The sync command may also be generated in different ways. FIG. 5A shows an architecture in which the instruction/data manager 194 generates a sync request 595, and the sync controller 196 then generates the sync command in response. For example, the manager 194 may determine that instructions or data may not arrive in time from the remote memory 160 to keep up with the static schedule. The manager 194 may then generate a sync command to pause the execution of instructions.

Figure 5B:
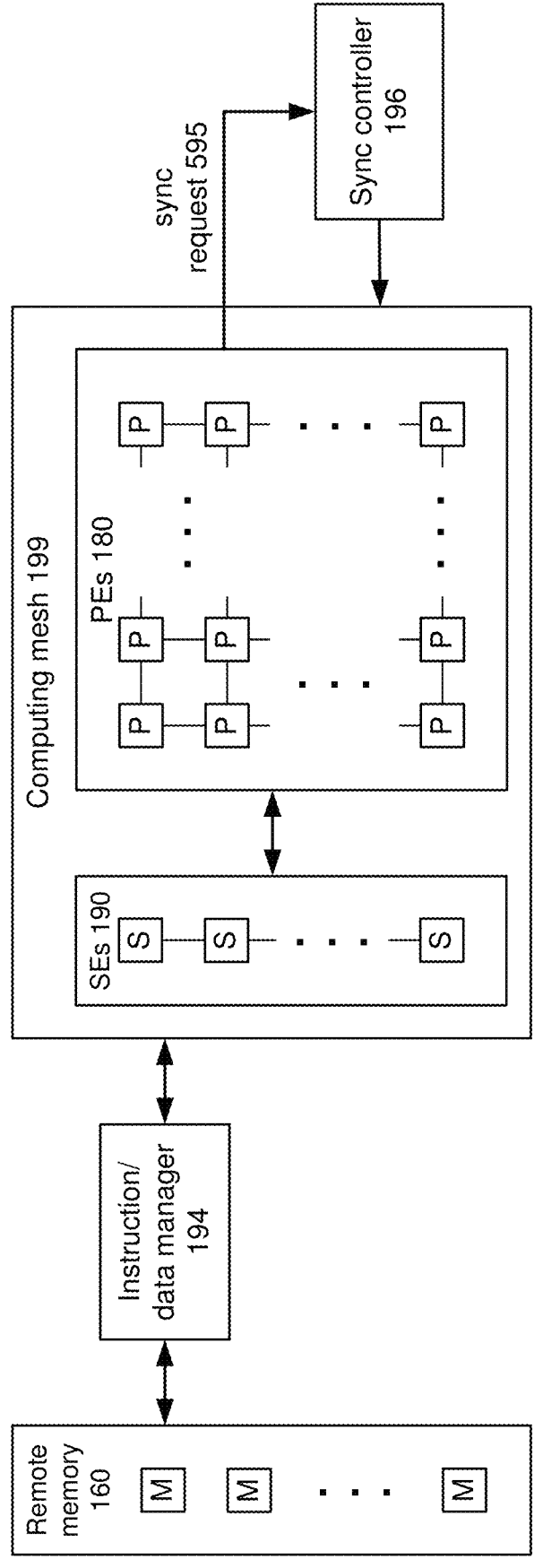
FIG. 5B is a block diagram illustrating sync requests from compute elements.

FIG. 5B shows an example in which the compute elements 180, 190 generate the sync request 595. For example, a PE may determine that its instruction queue does not have enough instructions to avoid stalling, or that data required for instructions is not yet available. The sync controller 196 then generates the sync command to the gap counters.

The resume command may be generated using analogous alternatives and then communicated from the sync controller 196 to the gap counters. Alternatively, the sync command may specify that the gap counters suspend counting for a certain number of cycles. The number of cycles may be an upper limit on the number of cycles required for the stall situation to resolve. In another approach, the sync controller 196 may periodically send sync commands that suspend counting for a fixed number of cycles, until the stall situation resolves.

Figure 6:
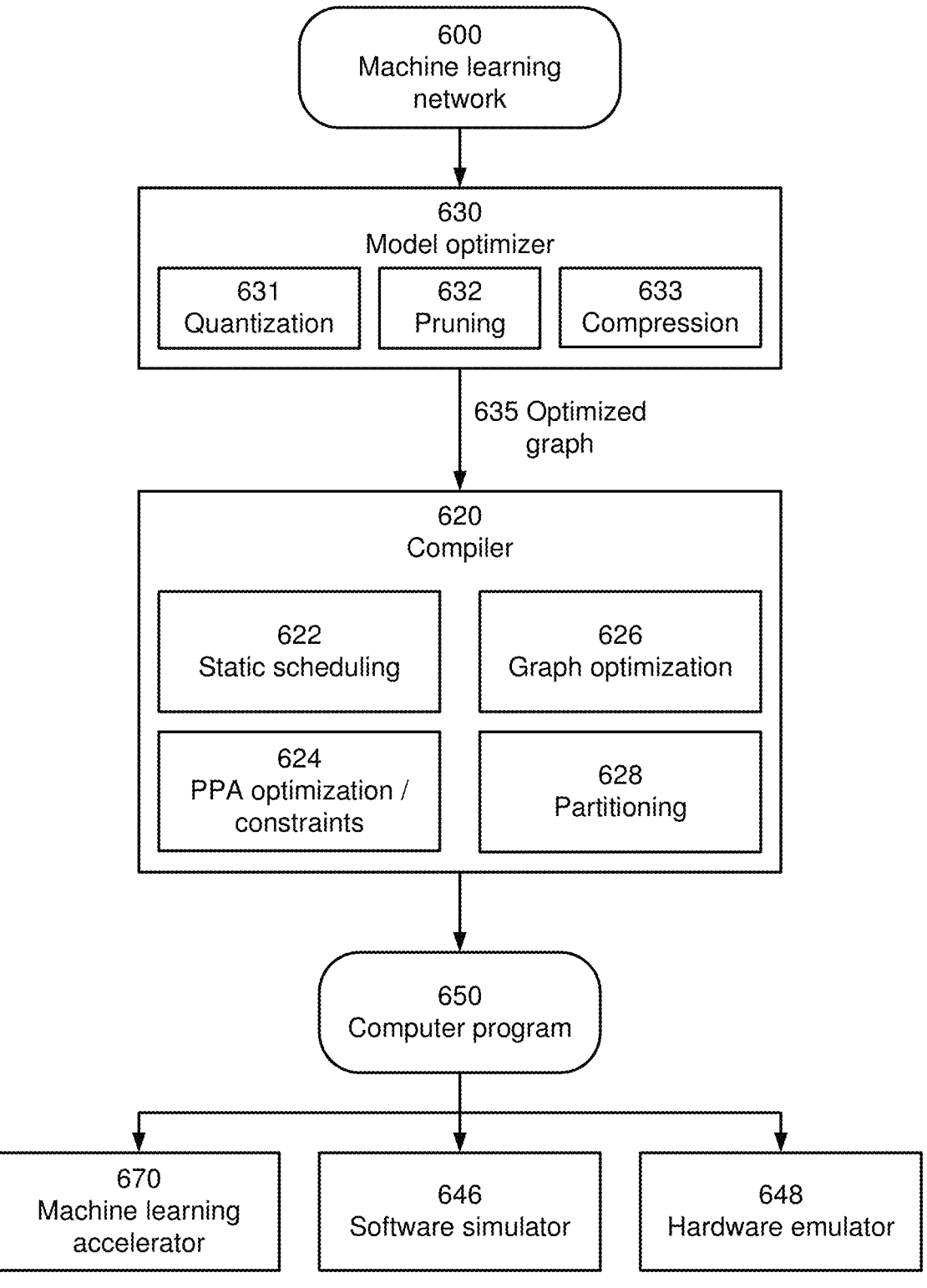
FIG. 6 is a block diagram of a software development environment including a machine learning (ML) compiler.

FIG. 6 is a block diagram of a software development environment including a machine learning (ML) compiler 620. In this example, the software development environment also includes a model optimizer 630. The model optimizer 630 receives a description of the MLN 600 and produces an optimized graph 635 of the MLN. It may apply optimizations such as quantization 631, pruning 632 and/or compression 633. Quantization 631 reduces the resolution of calculated values. For example, floating point values may be quantized to a certain number of bits and then integer math used instead of floating point math. This reduces the complexity and power consumed by the Tiles. Pruning 632 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 635 of the MLN may be expressed as a graph, in which the nodes of the graph represent nodes in the MLN and the edges of the graph represent the weighted interconnects. The compiler 620 receives the optimized graph 635 and produces the resulting computer program 650. The compiler 620 may perform operations including static scheduling 622, PPA (power performance area) optimizations 624, graph optimizations 626 and/or partitioning 628.

In order to statically schedule 622 the deterministic instructions, the compiler typically will know the duration of each instruction (i.e., how long each instruction takes to execute), the capabilities of each element (which processing elements and storage elements can execute which instructions), the topology of data transfer paths to and from Tiles (including between Tiles, and between Tiles and on-chip memory), and the computations required and their dependencies (i.e., the MLN description). With this information, the compiler can schedule unconditional start times for the deterministic instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

PPA optimization 624 includes different optimizations of the computer program 650. For example, the allocation of MLN computations to Tiles may be optimized to reduce power consumption, to increase performance (such as reducing latency or increasing throughput) and/or to reduce area (e.g., number of Tiles used). The compiler 620 may also optimize 624 the computer program 650, subject to constraints on power, performance, area and/or any of the quantities described above. Graph optimization 626 includes analysis of the graph representing the MLN to prune, merge or quantize links, parameters, values, and layers to achieve better performance. Partitioning 628 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 650 may be loaded into memory for execution on a machine learning accelerator 670. For example, one possible application is object detection. In this case, the inputs are images captured by a video camera. The MLN 600 has been trained to identify certain objects in the video images. The computer program 650 implementing the MLN is loaded onto memory that is accessible by the MLA 670, which is implemented as a chip inside the camera. This way, images captured by the video camera may be immediately analyzed by the computer program 650 running on the MLA 670.

In addition to the MLA 670, the computer program 650 or parts of it may be run on a software simulator 646 and/or hardware emulator 648 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Figure 7:
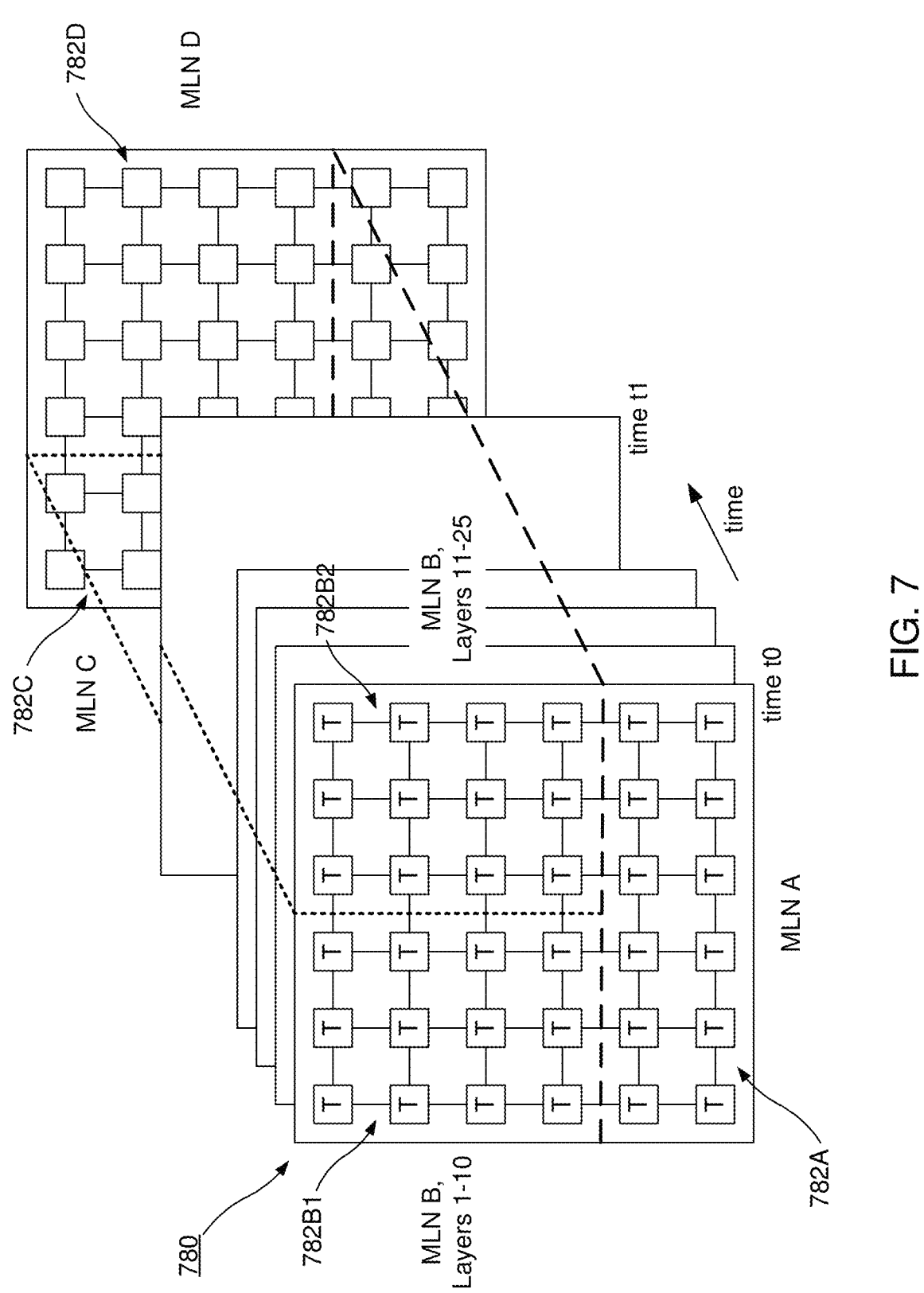
FIG. 7 is a block diagram of an MLA with a 6×6 mesh of Tiles.

The embodiments described above may be used to execute a single MLN. However, the MLA is enabled to execute multiple MLNs. FIG. 7 illustrates partitioning the mesh of Tiles to different subnets of an MLN and to different MLNs. In FIG. 7, the MLA includes a 6×6 mesh (element 780 in FIG. 7). From time t0 to t1, the mesh 780 is utilized to implement two different MLNs: MLN A and MLN B. The Tiles are divided into three partitions 782A, 782B1, and 782B2. Partition 782A implements MLN A, partition 782B1 implements the first 10 layers of MLN B, and partition 782B2 implements the remaining 15 layers of MLN B. MLN B may be partitioned in this manner because some off-Tile operations may be required between layers 10 and 11. Maybe the output of layer 10 requires a computation that is performed off-Tile in a non-deterministic manner, or maybe layers 11-25 require data that cannot be loaded in a manner consistent with the static scheduling of layers 1-10. After time t1, the mesh 780 continues to implement MLN B using partition 782A, but MLN A is replaced by MLNs C and D using partitions 782C and 782D, respectively.

FIG. 7 shows a progression over time. The front diagram shows the partitioning at an earlier time and the subsequent diagrams show the partitioning at later times. The times are indicated to the lower right of the diagrams. At time t0, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. 11-25. The upper left 4×2 Tiles now implement MLN C, and the upper right 4×4 Tiles now implement MLN D. The different MLNs may execute and maintain synchronization independent of each other.

Figure 8:
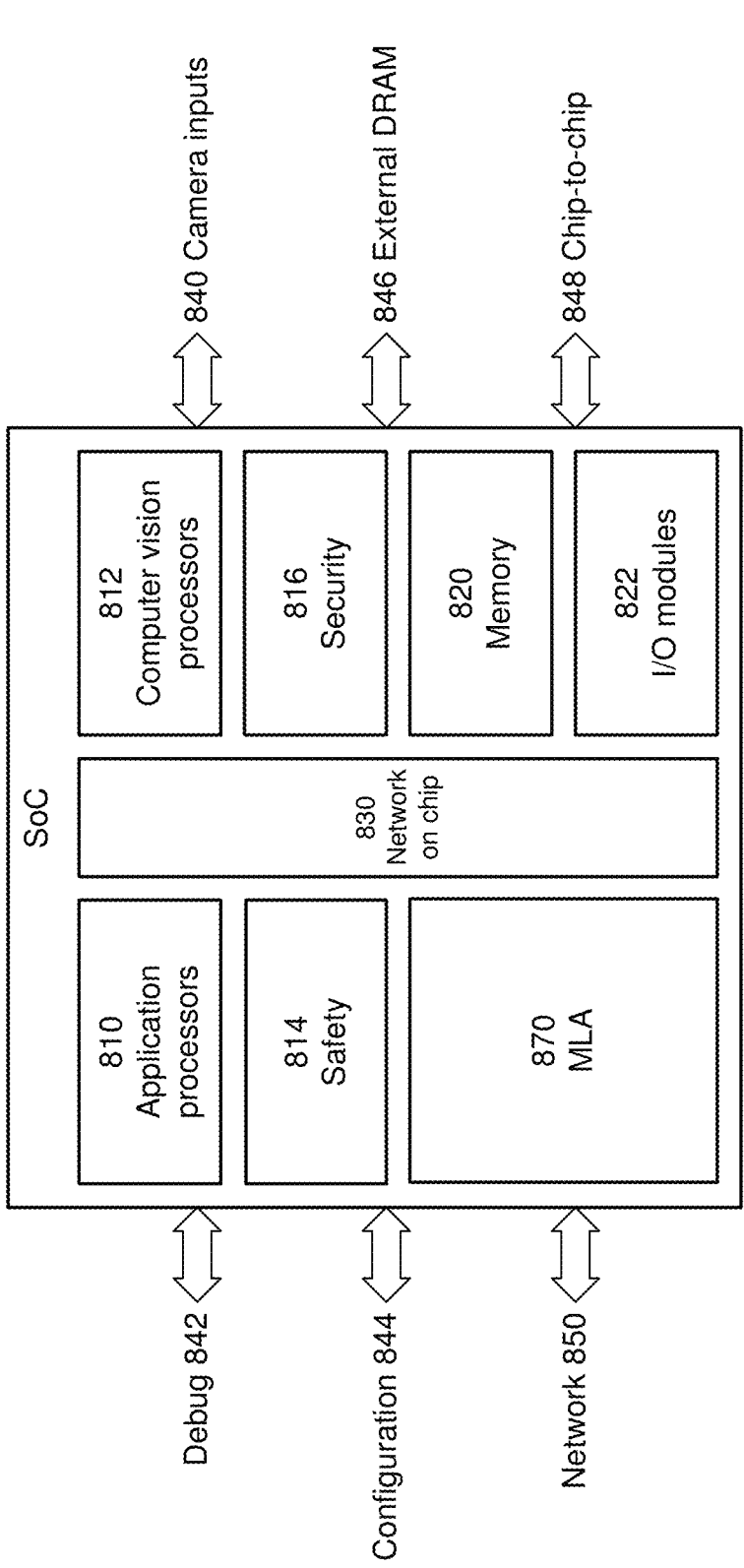
FIG. 8 is a block diagram of an integrated circuit that includes an MLA.

As discussed above, the MLA includes various components that are on the same die. The MLA may be integrated into a larger integrated circuit product (e.g., as part of an edge device). FIG. 8 is a block diagram of an integrated circuit that includes an MLA 870. Other components may be included on the same die as the MLA. This example includes the following additional blocks: application processor 810 (e.g., general purpose CPU running applications), computer vision processor 812 (or other types of application-specific processors), safety 814, security 816, additional SRAM (memory) 820 and input/output circuitry 822. It also includes a network 830 for communication between the different components. This type of semiconductor chip may be referred to as a system-on-chip (SoC).

The connections to the external world include camera inputs 840 for the computer vision processors, ports for debug 842 and configuration 844, a connection 846 to external memory (e.g., DRAM), chip-to-chip connections 848, and network connections 850 (e.g., Ethernet and PCIe).

The SoC of FIG. 8 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 812, which perform initial operations such as edge detection and enhancement, contrast enhancement, motion detection, and optical flow. Raw and/or processed images may be then input to the MLA 870 for analysis by the machine learning network. The MLA may also receive other inputs, such as metadata from other sources and data from other sensors. The application processors 810 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a speed of at least 50 TOPs (50 trillion operations per second) at a power consumption of not more than 5 watts. The speed may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A machine learning accelerator (MLA) implemented on a semiconductor die, the MLA comprising a computing mesh of interconnected compute elements configured to execute a program of instructions to implement a machine learning network according to a static schedule for execution of the instructions by the compute elements, the compute elements comprising gap counters that count cycles between pairs of first and second instructions executed by the compute elements; wherein execution of the second instructions depends on a count of the gap counters reaching a gap count of cycles between the first and second instructions and the gap counters suspend counting cycles in response to a sync command for maintaining synchronization between the compute elements.

2. The MLA of claim 1, wherein at least one instruction that has started to execute on an individual compute element before the gap counter for that compute element suspends counting cycles, continues to execute after the gap counter suspends counting cycles.

3. The MLA of claim 1, wherein the first and second instructions of every pair are consecutive instructions.

4. The MLA of claim 1, wherein at least one pair of first and second instructions are separated by at least one additional instruction, and the additional instructions are executable without dependencies on other compute elements.

5. The MLA of claim 1, wherein at least one compute element is configured to execute a plurality of pipelines of instructions, and at least one pair of first and second instructions for that compute element are instructions in two different pipelines for that compute element.

6. The MLA of claim 1, wherein each compute element includes one gap counter.

7. The MLA of claim 1, wherein at least two of the compute elements share one gap counter.

8. The MLA of claim 1, wherein at least one compute element includes multiple gap counters.

9. The MLA of claim 1, wherein the sync command specifies a number of cycles to suspend counting cycles, and the gap counters resume counting cycles after the number of cycles.

10. The MLA of claim 1, wherein the gap counters resume counting cycles in response to a resume command.

11. The MLA of claim 1, wherein the compute elements comprise storage elements (SEs) and processing elements (PEs); and the instructions include data transfer instructions for data transfer between the SEs and/or PEs and compute instructions for computations by the PEs.

12. A machine learning accelerator (MLA) implemented on a semiconductor die, the MLA comprising:

a computing mesh of interconnected processing elements (PEs) configured to execute a program of instructions to implement a machine learning network according to a static schedule for execution of the instructions by the PEs;

a memory interface to off-chip memory, wherein the instructions are stored in the off-chip memory;

an instruction manager that receives the instructions from the off-chip memory and transfers blocks of the instructions to the computing mesh for execution; and a sync controller that generates a sync command to avoid stalling of the PEs due to a lack of instructions;

wherein the PEs comprise gap counters that count cycles between pairs of first and second instructions executed by the PEs, execution of the second instructions depends on a count of the gap counters reaching a gap count of cycles between the first and second instructions, and the gap counters suspend counting cycles in response to the sync command.

13. The MLA of claim 12, wherein:

the computing mesh further comprises interconnected storage elements (SEs), and the instructions include data transfer instructions for data transfer between the SEs and/or PEs and compute instructions for computations by the PEs;

the PEs comprise a two-dimensional array of PEs with PEs connected to their adjacent neighbors, and the SEs comprise a ring of SEs around the array of PEs with SEs connected to PEs on a periphery of the array.

14. The MLA of claim 13, wherein the SEs are SRAM, the off-chip memory is DRAM, and the SEs and PEs have DMA access to the DRAM.

15. The MLA of claim 12, wherein the sync controller generates the sync command in response to a sync request from one of the PEs.

16. The MLA of claim 12, wherein the sync controller generates the sync command in response to a sync request from the instruction manager.

17. The MLA of claim 12, wherein the sync controller generates a resume command and the gap counters resume counting cycles in response to the resume command.

18. The MLA of claim 12, wherein the off-chip memory also stores the gap count of cycles between the first and second instructions.

19. The MLA of claim 12, wherein the instruction manager calculates the gap count of cycles between the first and second instructions.

20. The MLA of claim 12, wherein the instruction manager identifies the first and second instructions for the pairs, based on a type of the instructions.

* * * * *